(12) United States Patent
Flores et al.

(10) Patent No.: US 10,059,426 B2
(45) Date of Patent: Aug. 28, 2018

(54) QUICK CONNECTION ASSEMBLIES ESPECIALLY USEFUL FOR COUPLING AIRCRAFT ANTENNA FAIRINGS TO AIRFRAME STRUCTURES

(71) Applicant: EMBRAER S.A., São José dos Campos (BR)

(72) Inventors: Fabrício José Rodrigues Flores, São Jose dos Campos (BR); José Adalberto Felix, São Jose dos Campos (BR)

(73) Assignee: EMBRAER S.A., São José dos Campos (BR)

( * ) Notice: Subject to any disclaimer, the term of this patent is extended or adjusted under 35 U.S.C. 154(b) by 172 days.

(21) Appl. No.: 15/142,255

(22) Filed: Apr. 29, 2016

(65) Prior Publication Data

US 2017/0313402 A1 Nov. 2, 2017

(51) Int. Cl.
| | |
|---|---|
| *B64C 1/38* | (2006.01) |
| *B64C 1/36* | (2006.01) |
| *H01Q 1/42* | (2006.01) |
| *B64C 7/00* | (2006.01) |
| *H01Q 1/28* | (2006.01) |
| *H01Q 1/12* | (2006.01) |

(52) U.S. Cl.
CPC .............. *B64C 1/36* (2013.01); *B64C 7/00* (2013.01); *H01Q 1/1214* (2013.01); *H01Q 1/28* (2013.01); *H01Q 1/282* (2013.01); *H01Q 1/42* (2013.01)

(58) Field of Classification Search
CPC . B64C 1/36; B64C 7/00; H01Q 1/282; H01Q 1/2865; H01Q 1/286; H01Q 1/288; H01Q 1/28; H01Q 1/3275
See application file for complete search history.

(56) References Cited

U.S. PATENT DOCUMENTS

| | | | | |
|---|---|---|---|---|
| 5,961,071 | A * | 10/1999 | Proctor | B64D 9/00 |
| | | | | 244/118.1 |
| 9,531,064 | B2 * | 12/2016 | Keen | H01Q 1/28 |
| 9,761,939 | B2 * | 9/2017 | Pietila | H01Q 3/24 |
| 2012/0086613 | A1 * | 4/2012 | Lundeen | H01Q 1/1214 |
| | | | | 343/705 |
| 2012/0212391 | A1 * | 8/2012 | Dazet | B64C 1/36 |
| | | | | 343/872 |
| 2012/0248248 | A1 * | 10/2012 | Thompson | B64C 39/02 |
| | | | | 244/130 |
| 2015/0207214 | A1 * | 7/2015 | Wallace | H01Q 1/42 |
| | | | | 343/705 |
| 2017/0201017 | A1 * | 7/2017 | Cordone | H01Q 1/422 |

\* cited by examiner

*Primary Examiner* — Richard G Davis
(74) *Attorney, Agent, or Firm* — Nixon & Vanderhye P.C.

(57) ABSTRACT

Aircraft antenna fairing assemblies include a fairing shell and connection components for positionally fixing the fairing shell to airframe structure of an aircraft. The connection components may comprise a guide assembly having a guide head and a receiver defining a guide channel for receiving the guide head therewithin, and a latch assembly for latching the fairing shell to the airframe structure of the aircraft. The receiver of the guide assembly may define a generally C-shaped or generally U-shaped channel for receiving the guide head therewithin.

24 Claims, 19 Drawing Sheets

QUICK CONNECTION ASSEMBLIES ESPECIALLY USEFUL FOR COUPLING AIRCRAFT ANTENNA FAIRINGS TO AIRFRAME STRUCTURES

FIELD

The embodiments disclosed herein relate generally to connection assemblies which allow components to be quickly and removably coupled to one another. In preferred forms, the embodiments disclosed herein relate to connection assemblies that allow fairings, e.g., antenna fairings, to be quickly and removably connected to an aircraft's airframe structures.

BACKGROUND

Aircraft employ a variety of on-board equipment that may need to be exposed to the aircraft's external environment. For example, aircraft are typically provided with a variety of antenna for use with on-board navigation, communication, observation and/or weather avoidance equipment. These antenna are of a variety sizes, shapes and configurations and need to be physically covered by an aerodynamically profiled fairing so as to protect the antenna from environmental and/or weather damage. Fairings, including radar transparent radomes, therefore need to be physically attached to the aircraft's airframe structure in a reliably rigid manner to secure the fairing during flight operations. However, since the components that are protectively covered by a fairing may need to be serviced and/or replaced, there is a need to allow for the quick coupling/decoupling of the fairing relative to the airframe structure.

One prior proposal for providing a mounting plate adaptable to a plurality of models of aircraft is disclosed in U.S. Patent Application Publication No. 2015/0207214 (the entire contents of which are expressly incorporated hereinto by reference). Such prior proposal however is problematic in that a relatively large number of parts are necessary in order to secure the fairing to the aircraft structure, thereby increasing weight and installation time.

What has been needed in the art, therefore, are quick connection assemblies that can allow a fairing to be quickly and removably coupled to an aircraft's airframe structure. Specifically, what has been needed are faring connection systems and assemblies that do not create a significant weight or aerodynamic drag penalty and that do not transfer loads to the primary aircraft structure while allowing freedom of movement in the X and Y axes and also capable of withstanding lightning and bird strikes. The connection assemblies must also not present noise problems, vibration, buffeting and/or a risk of detachment while the aircraft is in flight. It is towards providing such assemblies that the embodiments disclosed herein are directed.

SUMMARY

The embodiments disclosed herein are generally directed toward aircraft antenna fairing assemblies which include a fairing shell and connection components for positionally fixing the fairing shell to airframe structure of an aircraft. The embodiments disclosed herein structurally are configured so as to have gaps in the X and Y axes with a free mount in the X axis with structural stops to prevent the fairing of the aircraft from being detached should frontal damage occur (e.g., as may occur with a bird strike) and which resists tension and compression loads thereon. The embodiments disclosed herein also regulates the pressure of the seals and latches, e.g., adjustments can be made with regard to the seal pressure against the aircraft structure without creating undue loading on the aircraft structure.

According to some embodiments, the connection components will comprise a guide assembly having a guide head and a receiver defining a guide channel for receiving the guide head therewithin, and a latch assembly for latching the fairing shell to the airframe structure of the aircraft. The receiver of the guide assembly may define a generally C-shaped or generally U-shaped channel for receiving the guide head therewithin.

According to certain embodiments, the guide assembly may include a guide arm having a proximal end connected to the fairing shell and an upright guide support having a base positionally fixed to the aircraft structure. The guide head may thus be provided at a distal end of the guide arm and the guide channel may be provided at a distal end of the upright guide support.

Some embodiments will include a receiver which is positionally fixed to the airframe structure with the guide assembly including a support bracket having a proximal end positionally fixed to the fairing shell, and a guide bolt having a shank portion threadably received at a distal end of the support bracket. A head portion of the guide bolt will thereby be aligned with the channel of the receiver.

An intermediate support may be provided in some embodiments. Such an intermediate support may include a base support member, an upright support bolt having a head portion threadably connected to the base support, and a bearing frame which bears against the head portion of the upright support bolt. The bearing frame may be positionally fixed to the fairing shell while the support base is positionally fixed to the airframe structure of the aircraft. The bearing frame may include a bearing flange which bears against the head portion of the upright support bolt.

The latch assembly is operatively connected to the fairing shell. In certain embodiments, the latch assembly will comprise an operation lever, a latch fork pivotally connected to the operation lever and a latch pin carried by the latch fork. The latch hook may thus be positionally fixed to the airframe structure, wherein the latch pin engages the latch hook to latch the fairing shell to the airframe structure.

The fairing shell may be provided with an access door. If present, the access door may include a door frame associated with the fairing shell, and a hinge assembly for hingedly connecting the access door to the door frame to allow hinged movements of the access door between open and closed conditions. Latch mechanisms may be provided to maintain the access door in the closed condition thereof.

The connection components may also include a pair of connection ribs positionally fixed to the airframe structure and a plurality of fasteners received by the connection ribs to removably attach a portion of the fairing shell to the connection ribs. The fairing shell may be provided with a corresponding pair of elongate diverters attached to the fairing shell in alignment with the connection ribs. Suitable fasteners may be received by the elongate diverters and the connection ribs to removably attach the portion of the fairing shell to the connection ribs. In some embodiments, the connection ribs may comprise an angled connection bracket having an upper forwardly sloped connection flange for receiving the fasteners therein, a lower substantially horizontally disposed flange for positional connection to the airframe structure, and an intermediate web joining the upper and lower flanges.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIGS. 11 and 12 are enlarged views of a representative forward connection guide assembly of the fairing connection components, wherein FIG. 11 is an enlarged cross-sectional elevational view thereof as taken along line 11-11 in FIG. 2 and FIG. 12 is an enlarged perspective view thereof;

FIGS. 13 and 14 are enlarged views of a representative aft connection guide assembly of the fairing connection components, wherein FIG. 13 is a cross-sectional elevational view thereof as taken along line 13-13 in FIG. 2 and FIG. 14 is an enlarged partly sectioned perspective view thereof;

Figure 15:
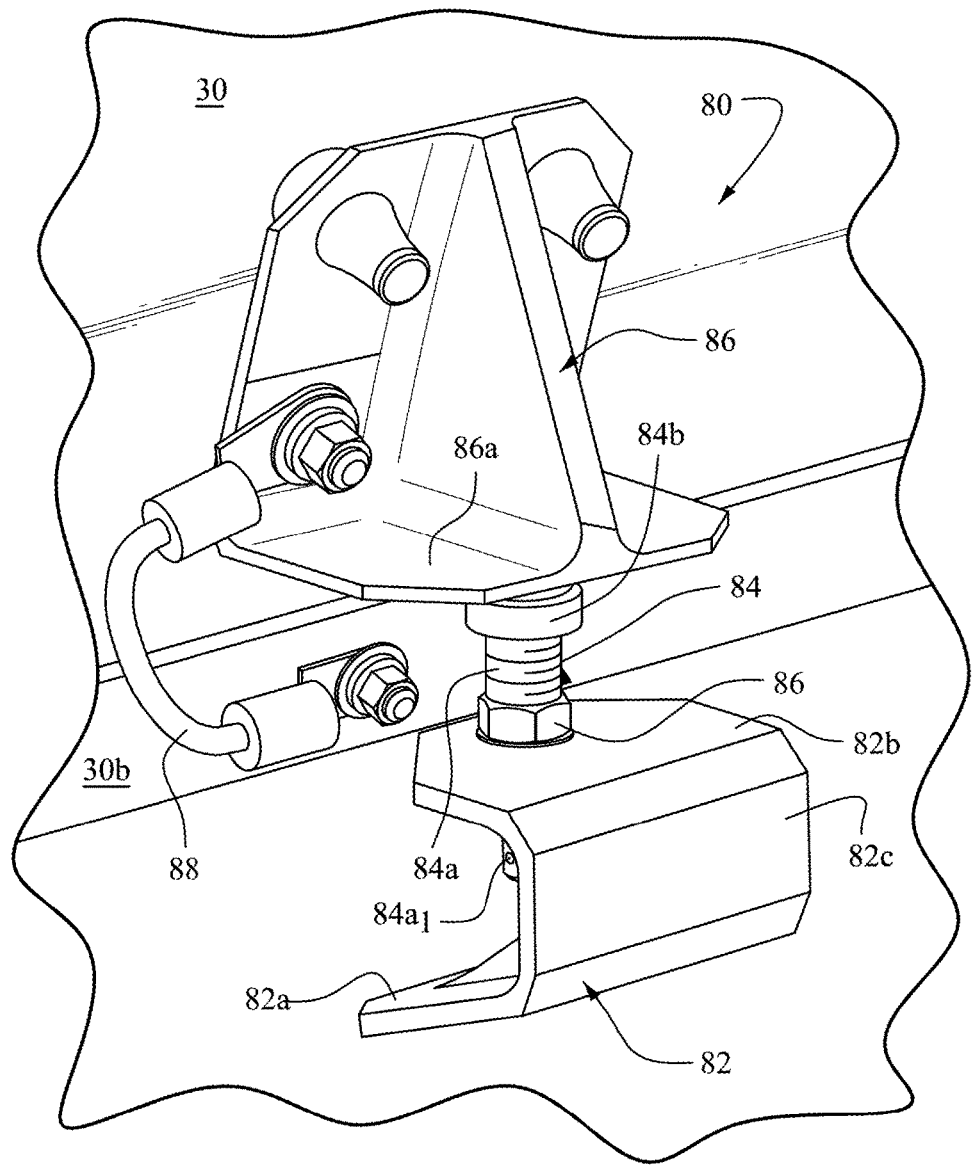
Figure 16:
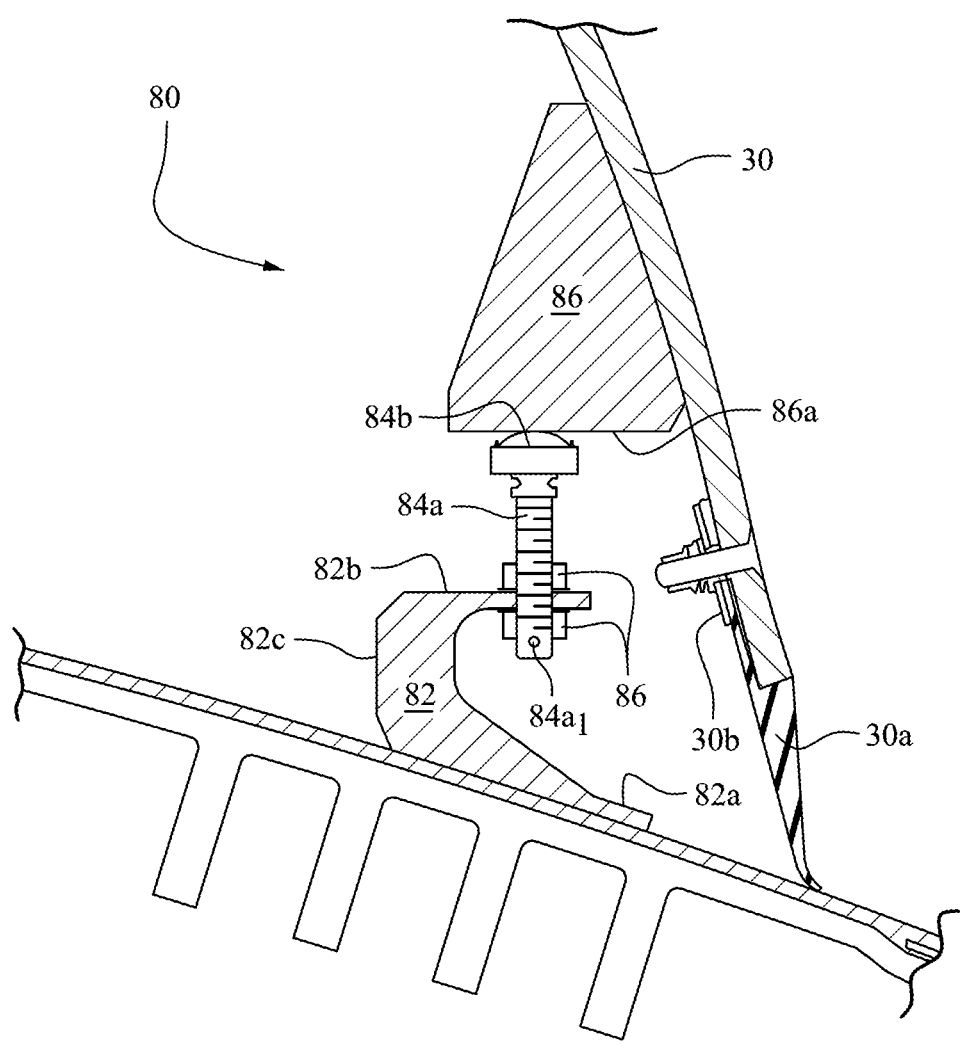
Figure 17:
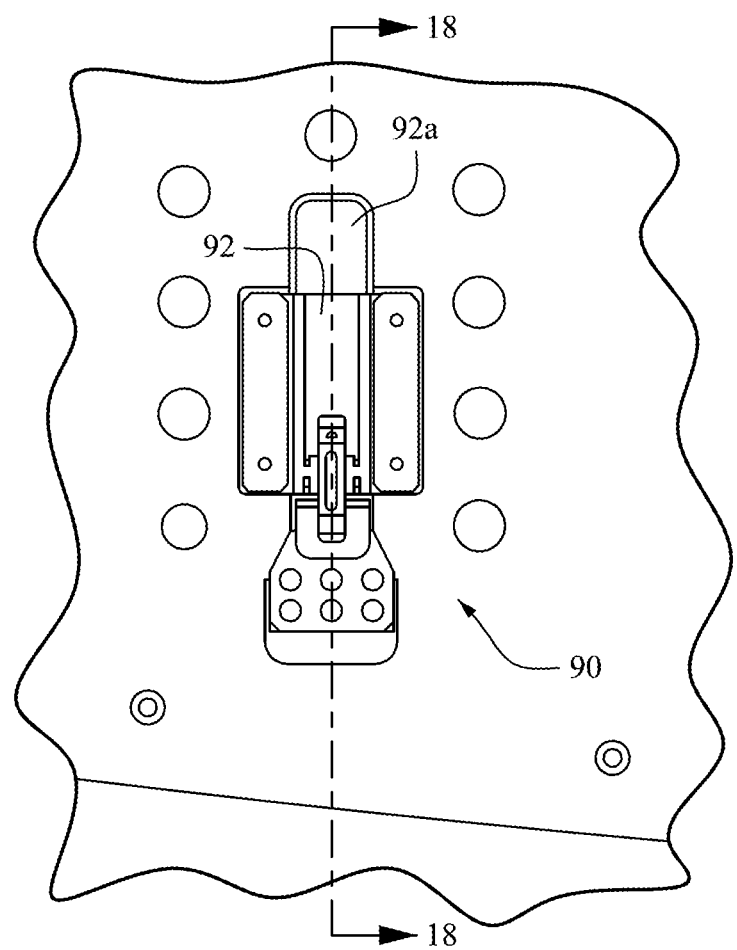
Figure 18:
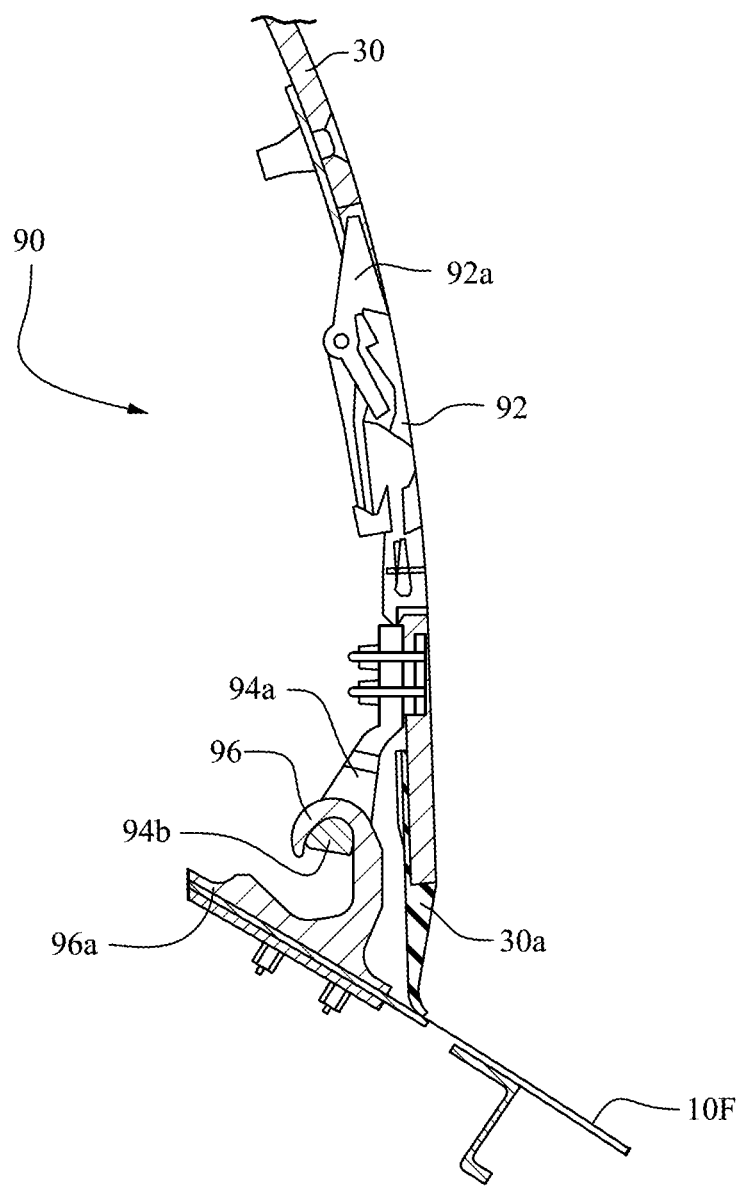
Figure 19:
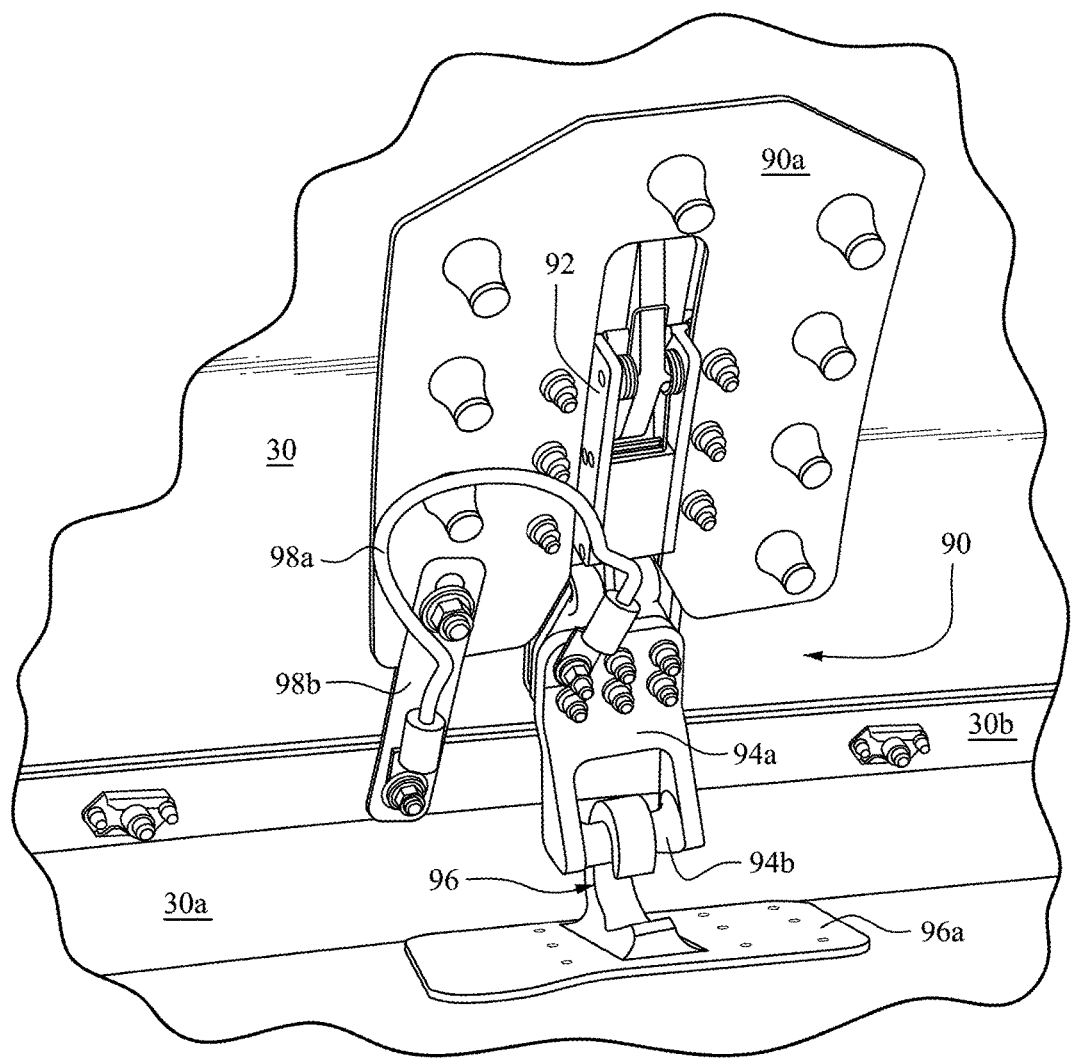

FIGS. 15 and 16 are enlarged views of a representative intermediate fairing support of the fairing connection components, wherein FIG. 15 is an enlarged interior perspective view thereof and FIG. 16 is a cross-sectional elevational view thereof as taken along lines 16-16 in FIG. 15; and FIGS. 17-19 depict a representative quick-release latch assembly associated with the fairing connection components, wherein FIG. 17 is an exterior elevational view thereof, FIG. 18 is a cross-sectional elevational view as taken along line 18-18 in FIG. 17 and FIG. 19 is an enlarged interior perspective view thereof.

DETAILED DESCRIPTION

Figure 1:
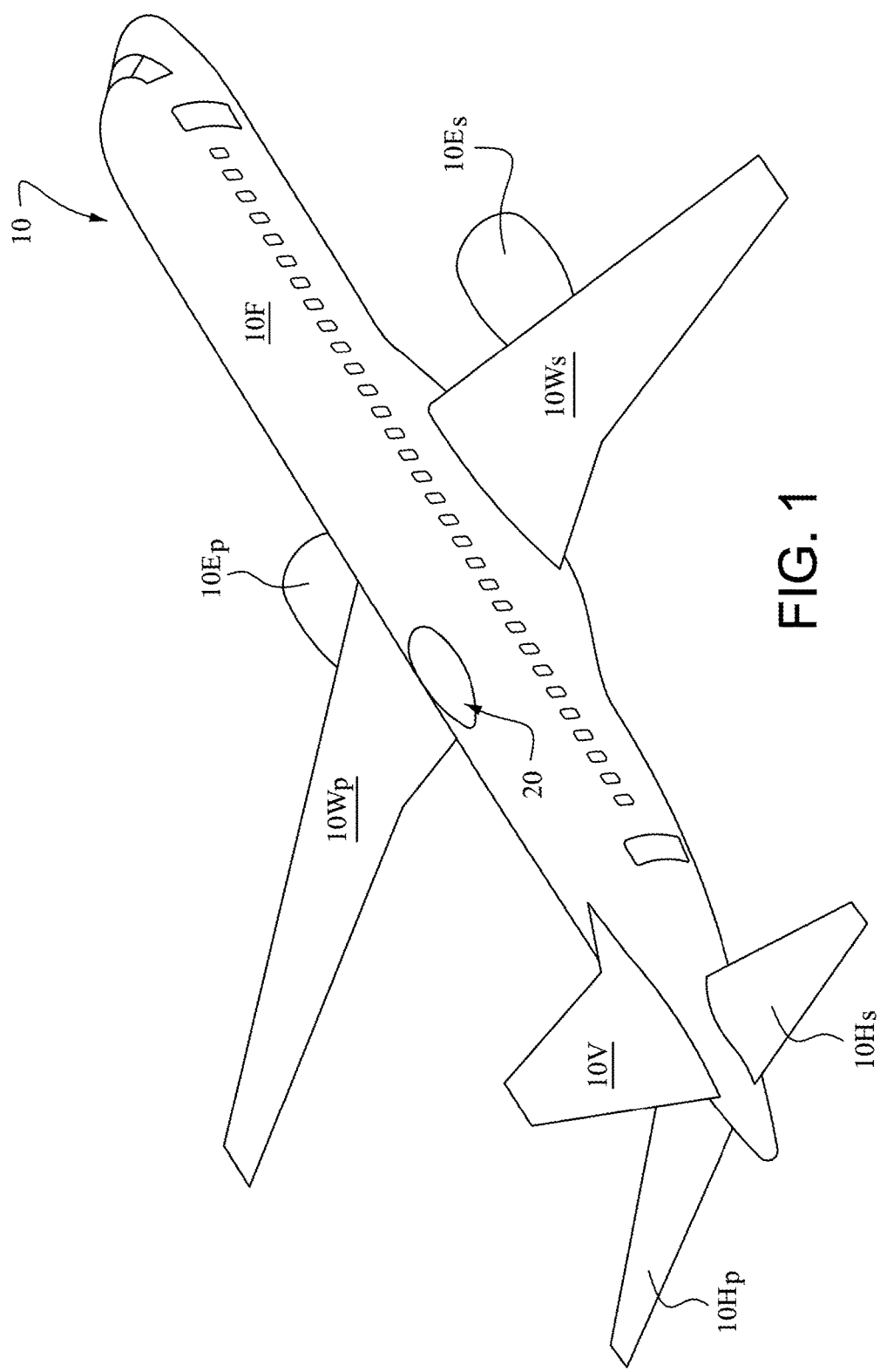
FIG. 1 is a rear perspective view of an aircraft which is provided with an antenna fairing assembly in accordance with an embodiment of the invention.
Figure 2:
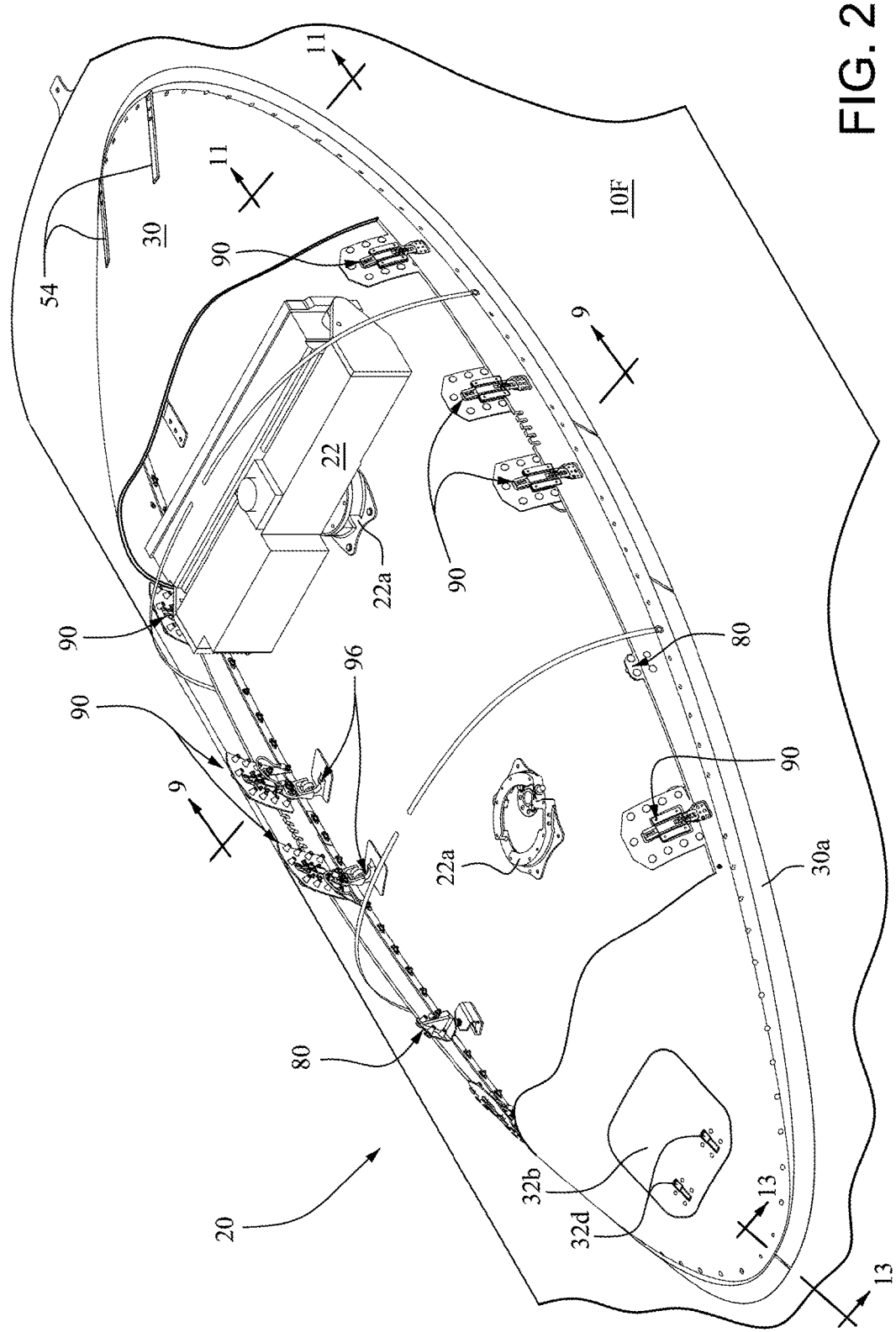
FIG. 2 is an enlarged rear perspective view, partly sectioned, of the antenna fairing assembly depicted in FIG. 1.
Figure 3:
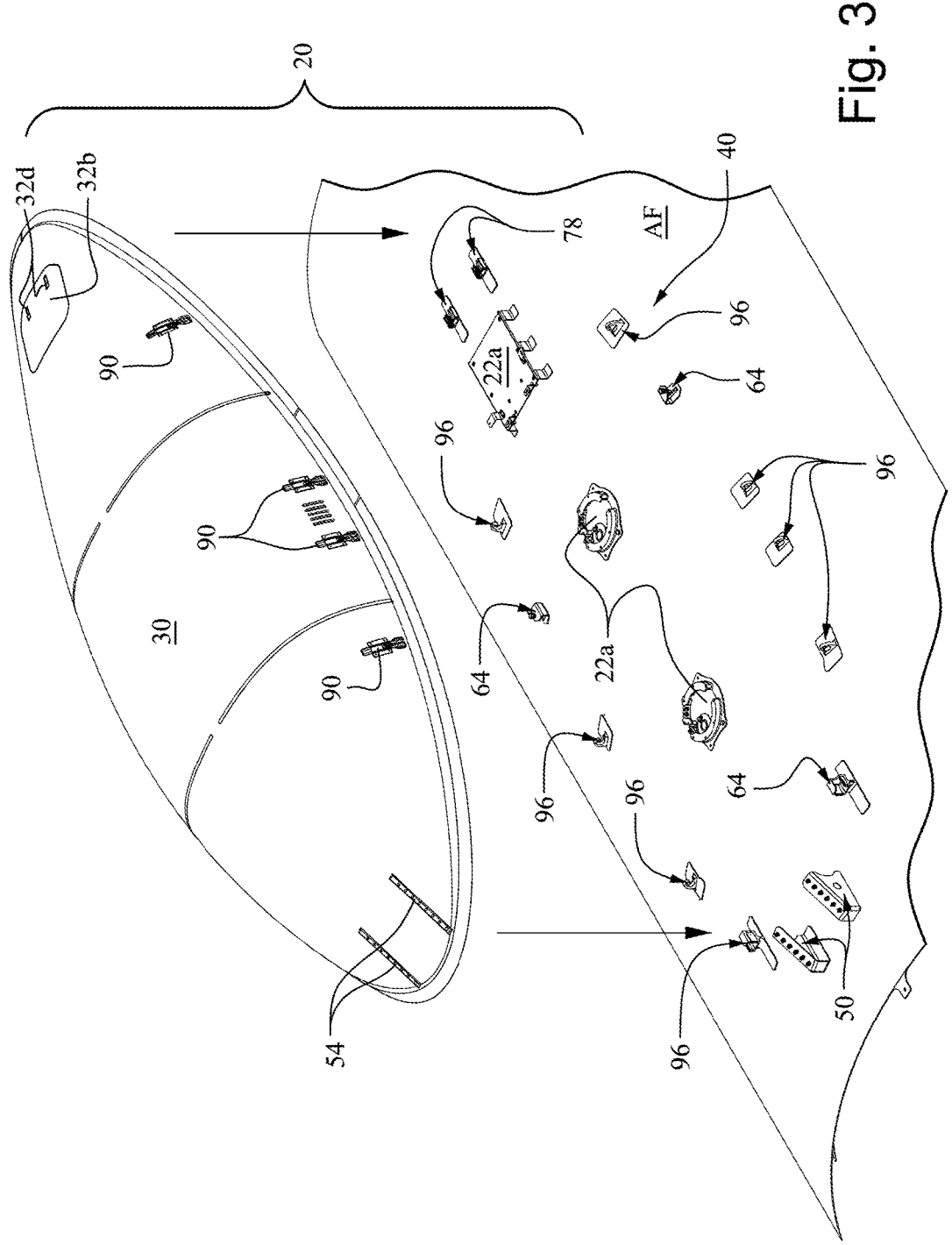
FIG. 3 is a front perspective view of the antenna fairing assembly depicted in FIG. 2 showing the antenna fairing shell exploded from the fairing mounting elements positionally fixed to a surface of the aircraft fuselage.
Figure 4:
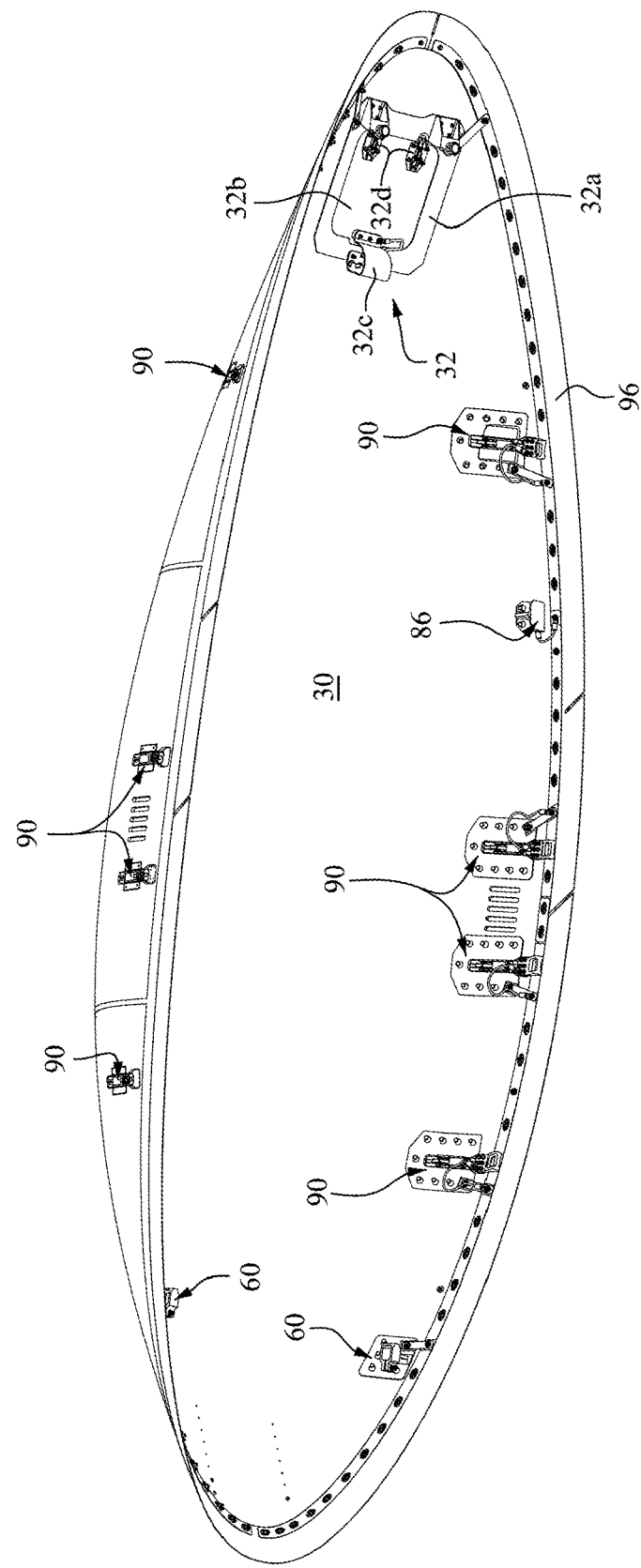
FIG. 4 is a bottom perspective view of the antenna fairing shell of the antenna fairing assembly depicted in FIG. 2.
Figure 5:
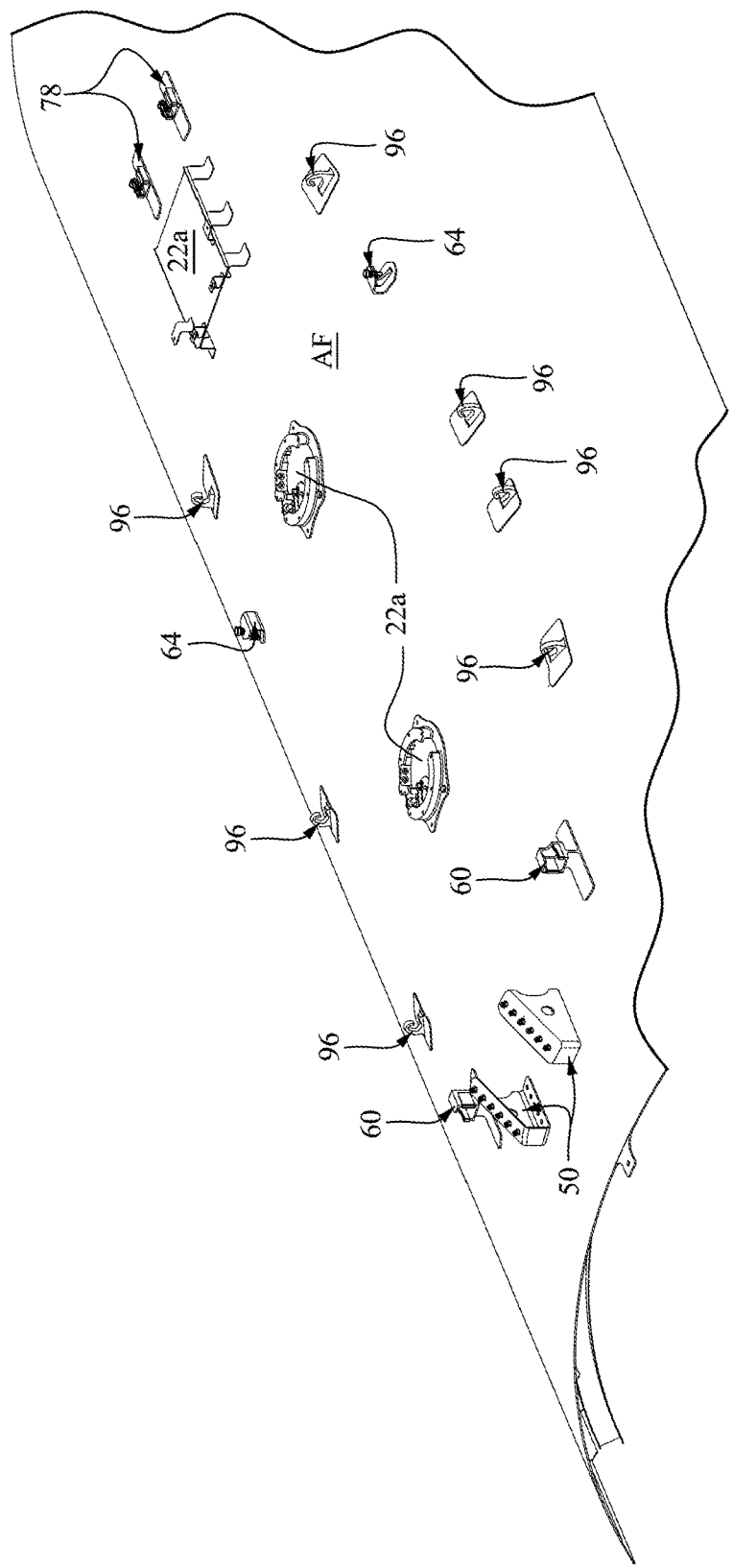
FIG. 5 is a perspective view of the fairing mounting elements positionally fixed to a surface of the aircraft fuselage.

Accompanying FIG. 1 depicts an aircraft 10 which conventionally includes an airframe comprised of a fuselage 10F, port and starboard wings 10Wp and 10Ws supporting wing-mounted turbofan engines 10Ep and 10Es, respectively, port and starboard horizontal stabilizers 10Hp and 10Hs and a vertical stabilizer 10V. An embodiment of an antenna fairing assembly 20 according to an embodiment of the invention is shown as being attached to the airframe structure of the aircraft 10, e.g., at an upper portion of the fuselage 10F. The fairing assembly 20 may however be attached to other locations of the airframe structure, for example, at a lower portion of the fuselage 10F or at the nose of the aircraft. As is conventional, the fairing assembly 20 may physically house an antenna 22 which is operatively connected to a mount assembly 22a associated operatively on the fuselage 10F (see FIG. 2).

The antenna fairing assembly 20 is shown in greater detail in accompanying FIGS. 2-5. As can be seen therein, the assembly 20 is generally comprised of a fairing shell 30 and a series of connection components which operatively engage with cooperative elements to be described in greater detail below to positionally couple the fairing shell 30 to the airframe structure of the fuselage 10F. The fairing shell 30 is most preferably formed of a suitably sturdy material that does not interfere with any electromagnetic signal associated with the antenna 22 housed thereby. By way of example, if the fairing shell 30 houses a radar antenna, then the fairing shell 30 would need to be transparent to the radar signal wavelengths. In general, the fairing shell 30 will likely be formed of a synthetic fiber reinforced resin that has been molded to an aerodynamic shape to cover the antenna profile.

Figure 6:
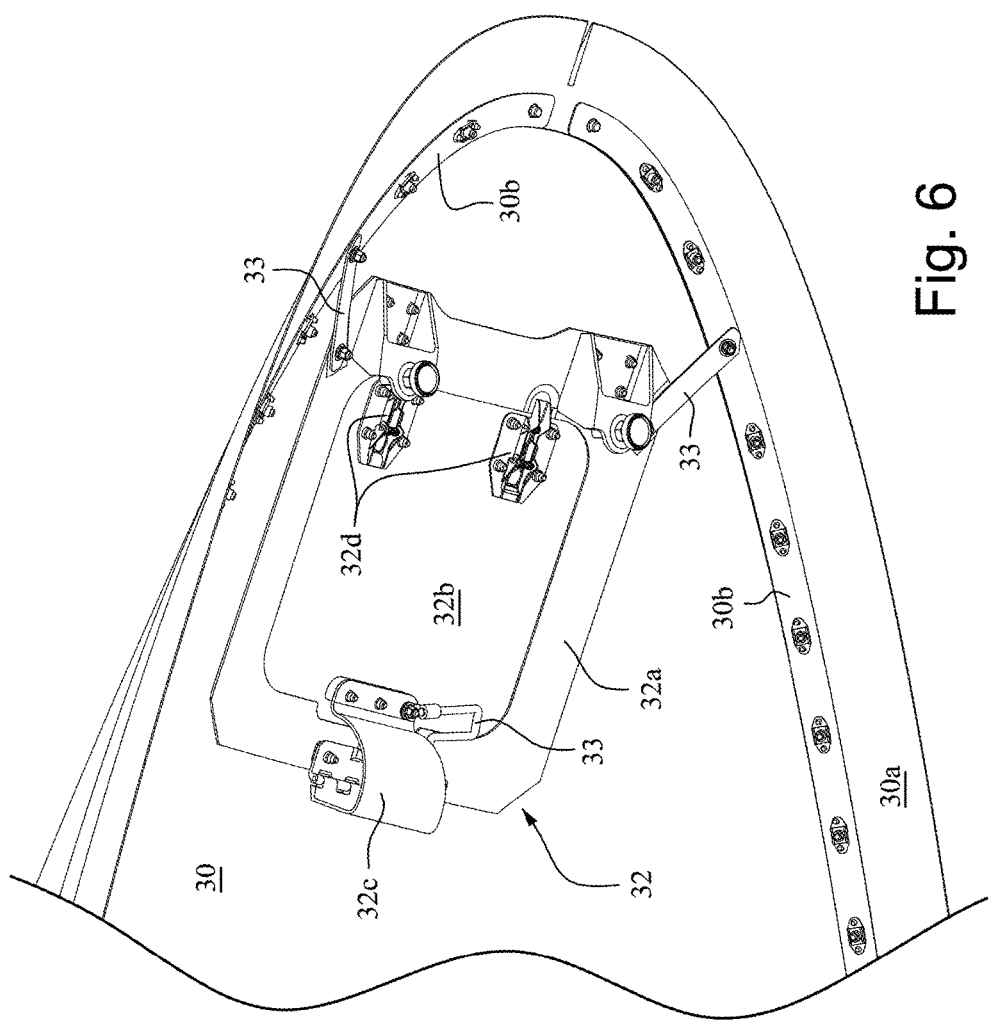
FIG. 6 is an enlarged bottom perspective view of the inspection door provided at a rear end of the fairing shell.
Figure 7:
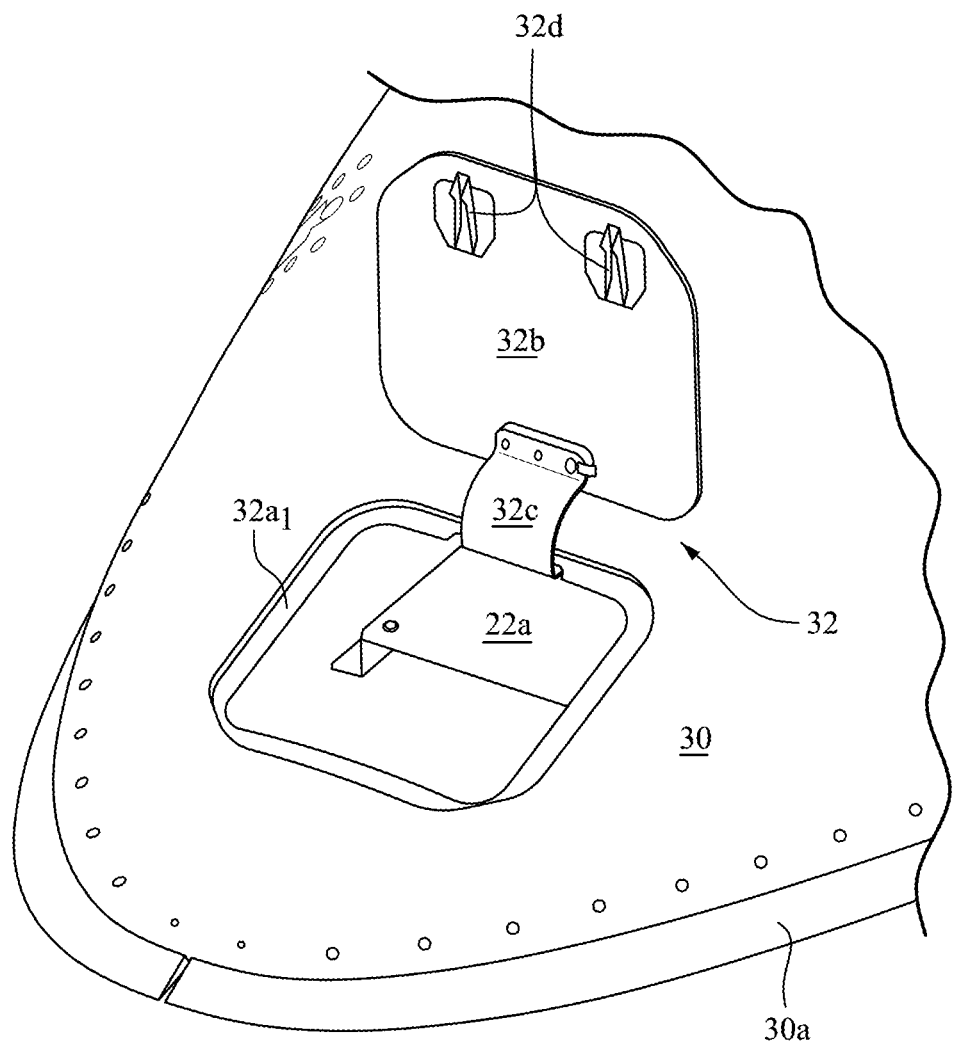
FIG. 7 is an enlarged top perspective view of the rear end of the fairing shell showing the fairing inspection door in an opened condition.
Figure 8:
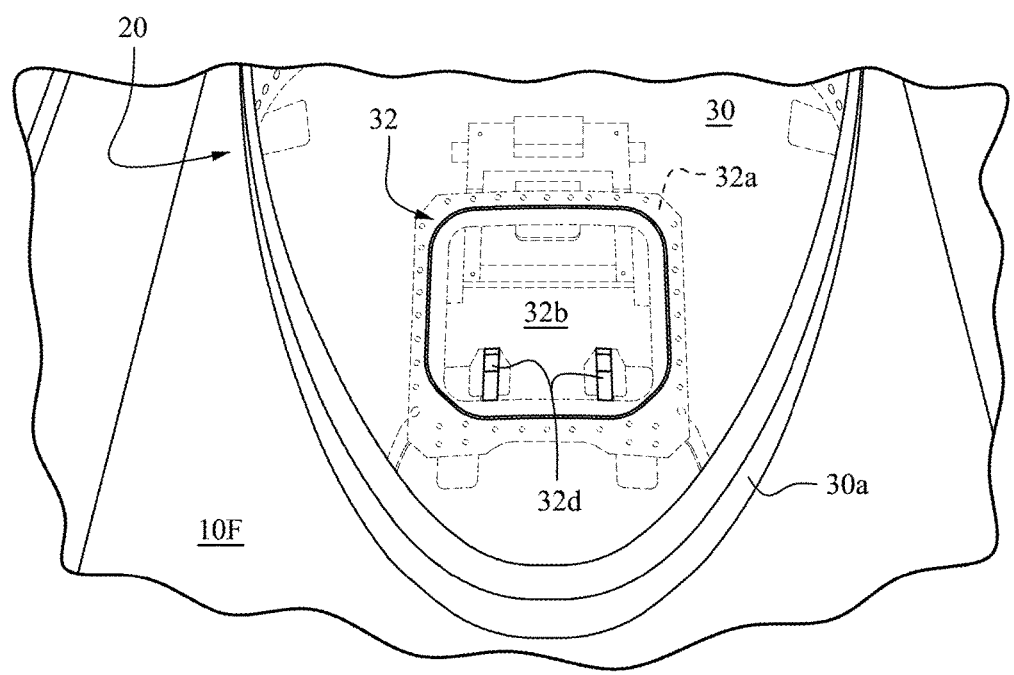
FIG. 8 is a top plan view of the rear end of the fairing shell showing the fairing inspection door in a closed condition.

As shown more specifically in FIGS. 6-8, the fairing shell 30 may include an access door assembly 32 having a door frame 32a (see FIG. 13) provided with a perimetrical edge seal 32a1, a door 32b and a hinge 32c which connects the access door 32b to the frame 32a to thereby allow the door 32b to be hingedly moved between a closed condition FIGS. 6 and 8 and an opened condition as shown in FIG. 7. A pair of manually operated latch mechanisms 32d latch the door 32b in its closed condition to the door frame 32a. The internal components of the antenna positioned on one of the mounts 22a and/or the connection components may be accessed physically while in the access door 32b is in its open condition. The access door 32b when opened thereby allows the connection components to be adjusted as may be necessary when installing the fairing shell 30 onto the fuselage 10F. As such, the entire fairing shell 30 does not necessarily need to be entirely removed for adjustment of the connection components and/or to perform certain maintenance or inspection operations pertaining to the antenna enclosed by the fairing shell 30. Grounding straps 33 may be provided so as to electrically interconnect the door frame 32a to a grounding strip 30b associated with the fairing shell 30.

In the depicted embodiment, the connection components are generally comprised of a pair of forward connection ribs 50 (see FIGS. 9 and 10), pairs of forward and aft connection guides 60, 70, respectively (see FIGS. 11-14), a pair of intermediate supports 80 (see FIGS. 15 and 16) and pairs of quick-release latch assemblies 90 (see FIGS. 17 and 18) positioned relative to the lower peripheral edge of the fairing shell 30. An elastomeric strip 30a may be attached to the lower peripheral edge of the fairing shell so as to provide an aerodynamic seal between the fairing shell and the fuselage AF when the former is attached to the latter by means of the connection components 20.

Figure 9:
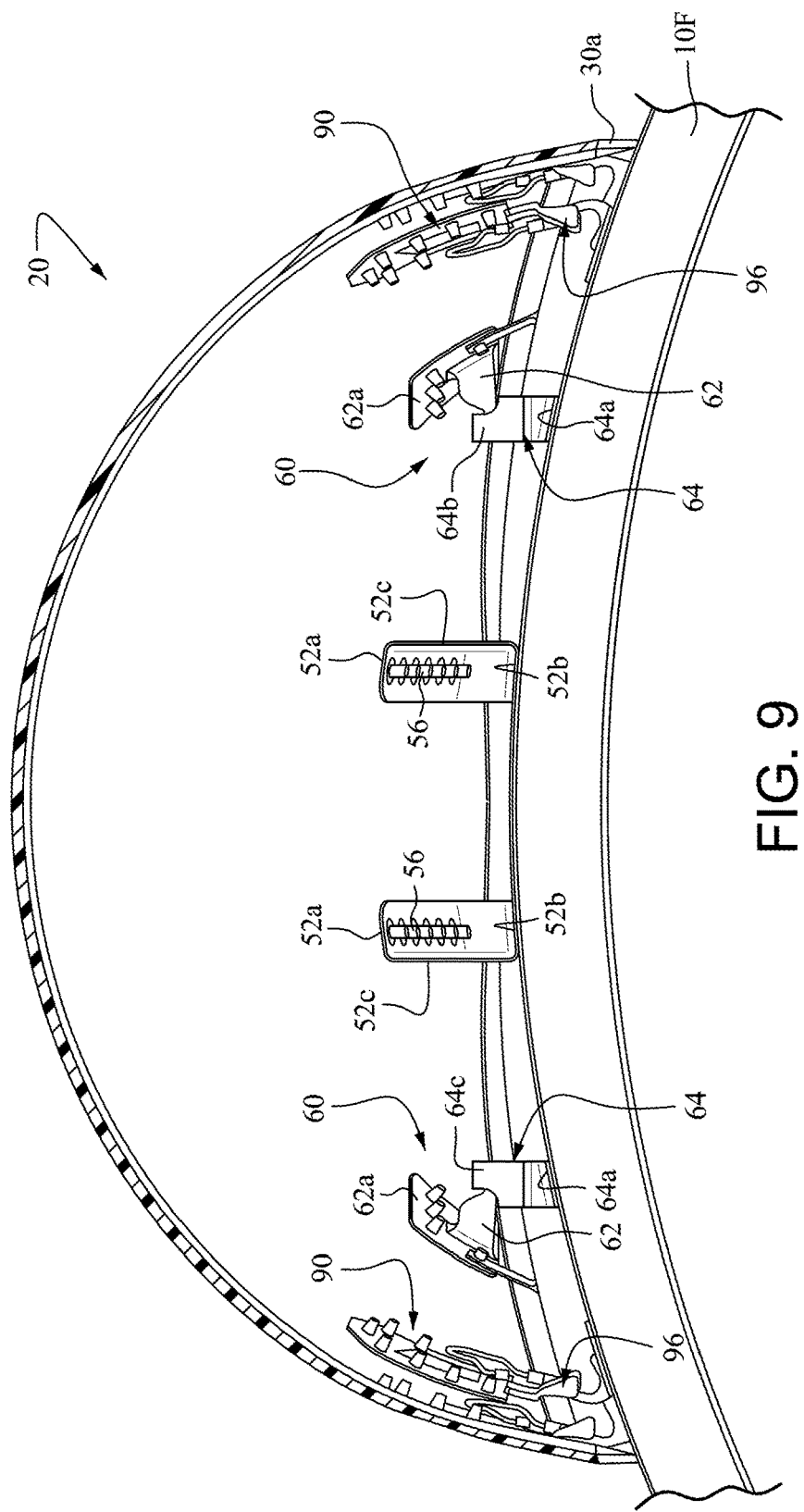
FIG. 9 is a cross-sectional elevational view of the fairing assembly as taken along line 9-9 in FIG. 2.
Figure 10:
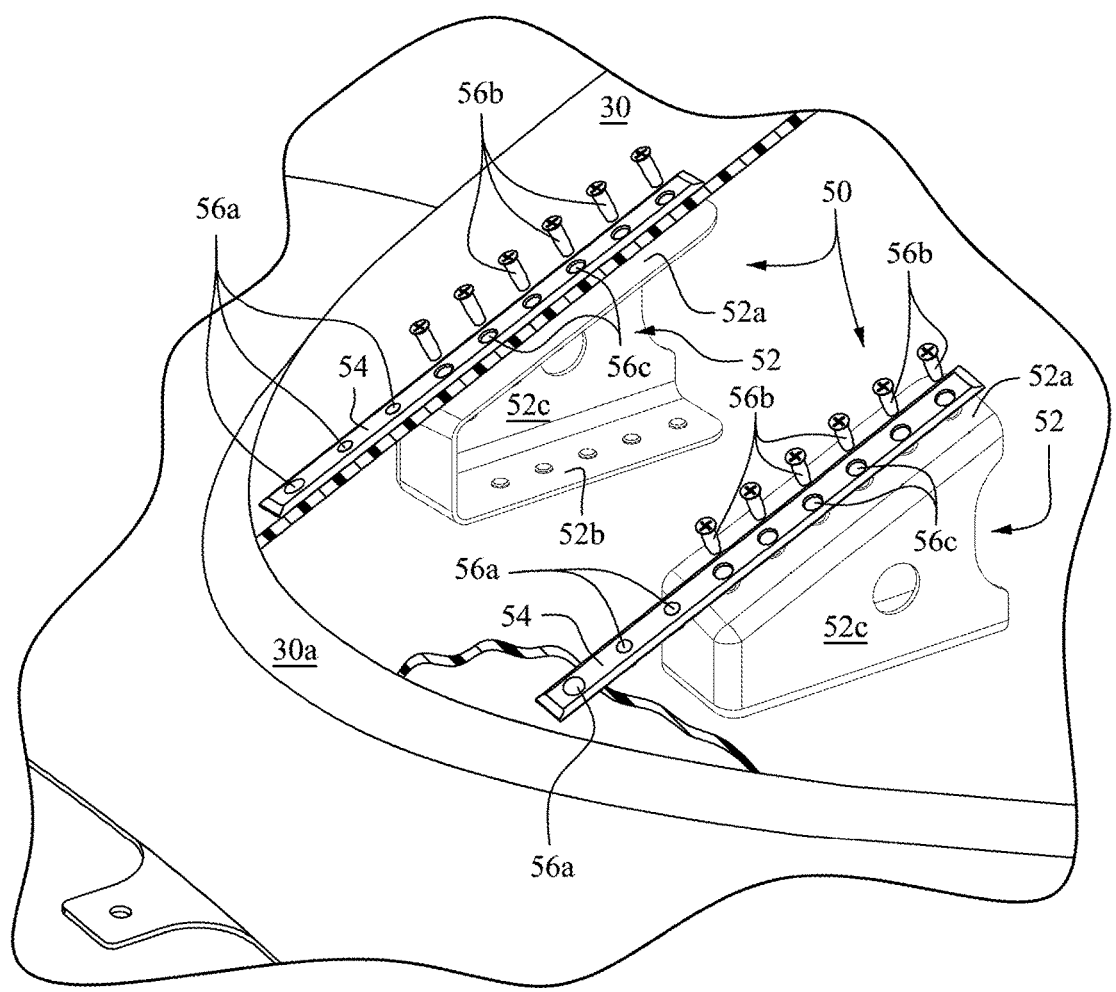
FIG. 10 is an enlarged partly exploded perspective view of the front connection ribs of the fairing connection components.

As is shown in FIGS. 9 and 10, the forward connection ribs 50 are generally comprised of an angled connection bracket 52 having un upper forwardly sloped connection flange 52a and a lower substantially horizontally disposed flange 52b separated from one another by an upright intermediate web 52c. A pair of elongate diverters 54 are attached to the forward end region of the fairing shell 30 so as to be in alignment with a respective one of the upper flanges 52a. The forward end portion of the diverters 54 may be physically attached to the fairing shell 30 by conventional rivets and/or screws 56a. The rearward end portion of the diverters 54 may be provided with an aligned series of apertures 56c to accept therein conventional fasteners (a representative few of which are identified by reference numeral 56b) to thereby connect the diverters 54 and the fairing shell 30 to the connection flange 52a of the angled connection bracket 52. Any conventional fastener may be employed, for example, quick release spring-loaded fasteners typically employed for aircraft installations, including those commercially available under the trade names of CAMLOC™ fasteners, AIRLOC™ fasteners and/or DZUS™ fasteners. The diverters 54 thereby provide structural reinforcement to the fairing shell 30 so as to allow tight yet removable connection to the upper connection flanges 52a by means of the fasteners 56b.

Figure 11:
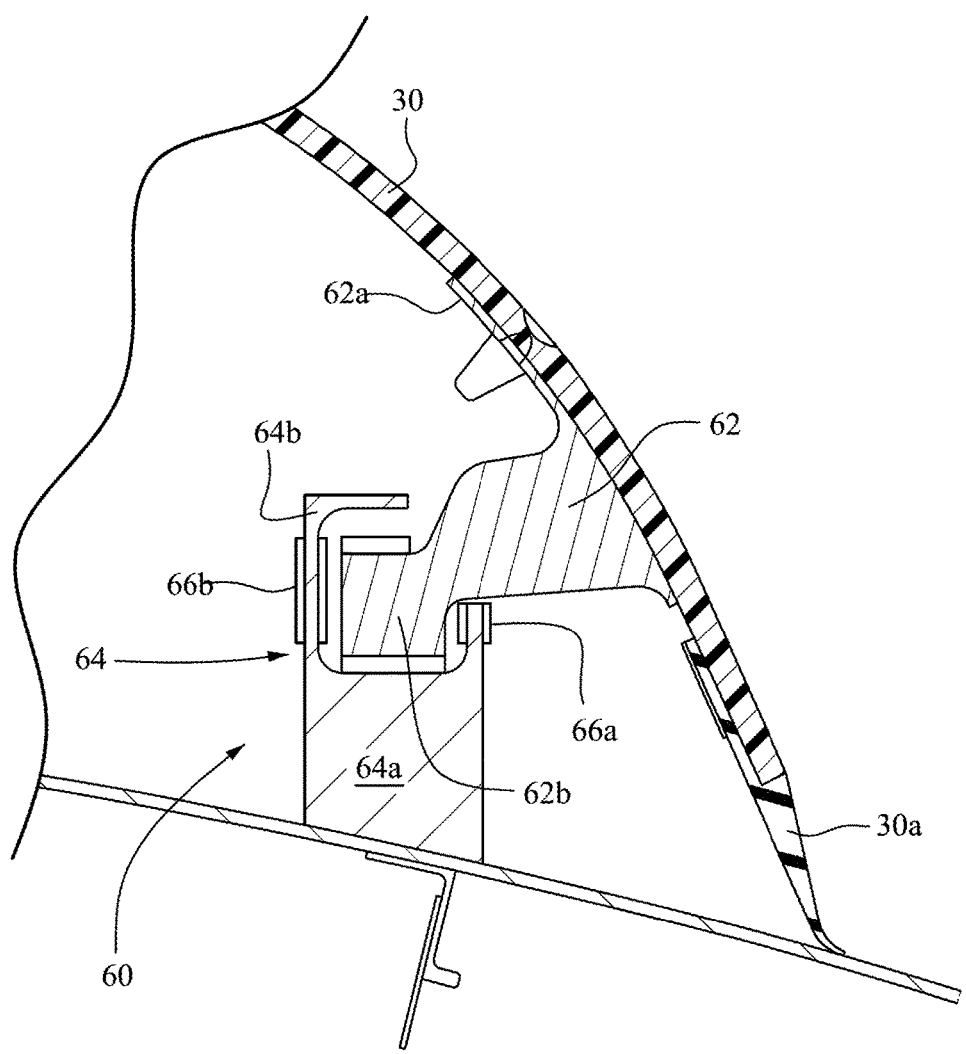
Figure 12:
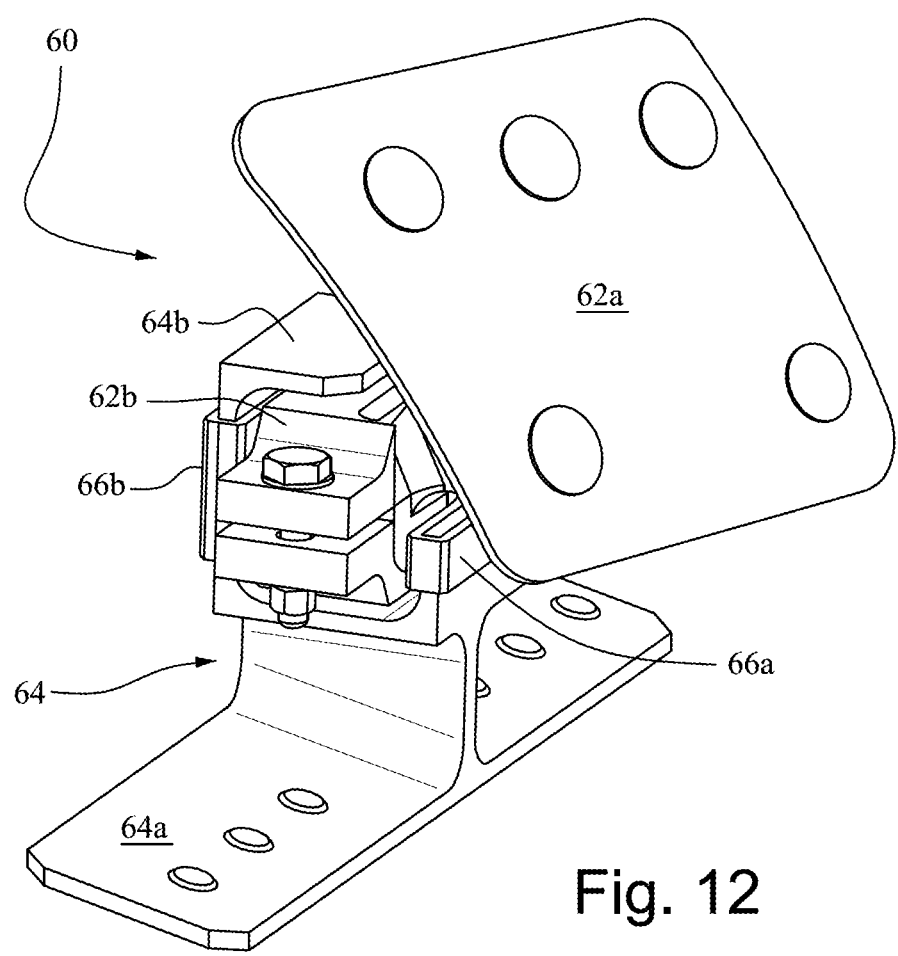

A representative forward connection guide 60 is depicted in FIGS. 11 and 12 as being comprised of a guide arm 62 which is fixed at its proximal end to a support plate 62a positionally fixed to the fairing shell 30 and terminates at its distal end in a head assembly 62b. An upright guide support 64 includes a base 64a positionally fixed at its lower end to the airframe structure of the fuselage 10F. A receiver 64b is formed at an upper end of the base 64a and defines a C-shaped channel that is sized and configured to receive therein the head assembly 62a. The receiver 64b may include a pair of opposed chafing pads 66a, 66b formed of a suitable low friction material (e.g., polytetrafluoroethylene or the like) at locations where contact may be made with the head assembly 62a so as to facilitate sliding movement of the latter into the former upon assembly of the fairing shell 30 onto the aircraft fuselage 10F.

Figure 13:
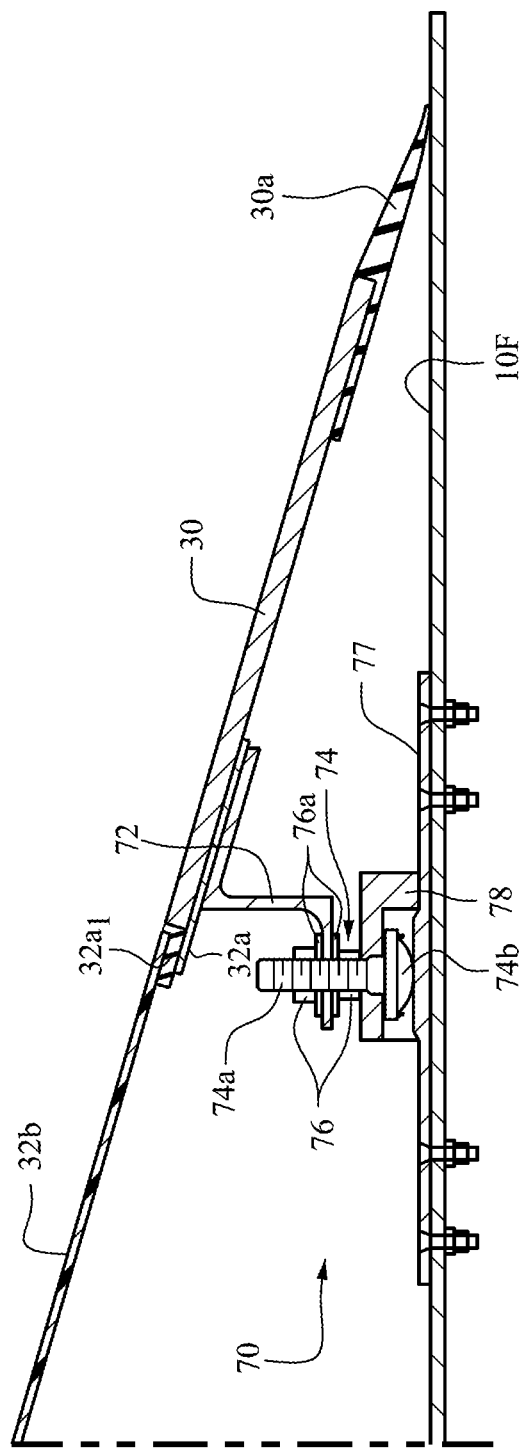
Figure 14:
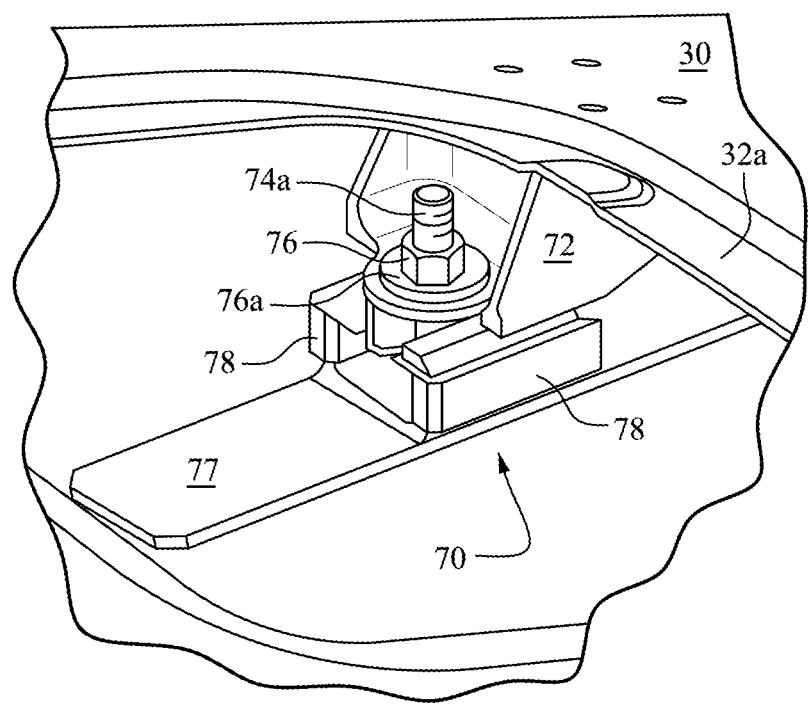

FIGS. 13 and 14 depict a representative aft connection guide 70. As shown, the aft connection guide 70 includes a support bracket 72 having a proximal end fixed to an aft region of the fairing shell 30 and a distal end which is connected to the threaded shank 74a of a guide bolt 74. More specifically, the threaded shank 74a is threadably received by a pair of adjustment nuts 76 and associated washers 76a which sandwich the proximal end of the support bracket 72 so as to positionally yet adjustably fix the shank 74a thereto. The distal end of the guide bolt 74 is provided with a head portion 74b which includes a low friction material (e.g., polytetrafluoroethylene or the like) to facilitate sliding contact between the head portion 74b and a lower bearing plate 77 fixed to the airframe structure of the fuselage 10F. The bearing plate 77 is provided with a fixed position receiver 78 which defines a generally U-shaped channel that is sized and configured to receive therein the head portion 74b of the guide bolt 74. Positionally fixing the shank 74a will in turn positionally fix the distance of the head portion 74b of the guide bolt 74 relative to the support bracket 72. Once the guide bolt 74 has been positionally fixed, its position may be maintained by use of conventional safety wire locking technique to adjacent structure using a predrilled hole (not shown) in the shank 74a.

FIGS. 15 and 16 depict a representative intermediate support 80. As shown, the intermediate support 80 includes a C-shaped base support member 82 having a lower 82a leg positionally fixed to the airframe structure of the fuselage 10F and an upper substantially horizontal leg 82b spaced above the lower leg 82a by a spacer leg 82c. The upper leg 82b carries an upright support bolt 84 having a threaded shank 84a which is threadably received by a pair of adjustment nuts 86 which sandwich the upper leg 82b of the base support member 82 so as to positionally yet adjustably fix the shank 84a thereto. The distal end of the support bolt 84 is provided with a head portion 84b which includes a pad formed of a low friction material (e.g., polytetrafluoroethylene or the like) to facilitate sliding contact between the head portion 84b and a bearing plate 86a associated with a bearing frame member 86 positionally fixed to the fairing shell 30. A grounding strap 88 may electrically interconnect the frame member 86 to the grounding strip 30b associated with the fairing shell 30. Once the support bolt 84 has been positionally fixed, its position may be maintained by use of conventional safety wire locking technique to adjacent structure using the predrilled hole 84a1 in the shank 84a thereof.

In order to ensure that the fairing shell 30 is connected securely to the fuselage 10F, a series of latch mechanisms 90 are provided. A representative latch mechanism 90 is shown in FIGS. 17-19. As shown therein, the latch mechanism 90 includes an operation lever 92 pivotally connected at a lower end thereof to a latch fork 94a carrying a latch pin 94b. A latch hook 96 is positionally fixed to the airframe structure of the fuselage 10F by a base plate 96a. The operation lever 92 includes a spring-loaded latch button 92a which allows the lever to be pivotally moved away from the fairing shell 30 in turn lowering the latch fork 94a thereby disengaging the pin 94b and the latch hook 96. Conversely, pivoting the operation lever 92 into a latched position as shown in FIGS. 17-19 causes the latch pin 94b to be engaged with the latch hook 96 until the latch button 92a is again returned to its engaged position. The fork 94a and the mounting plate 90a may be grounded to the grounding strip 30b associated with the fairing shell 30 by grounding straps 98a, 98b.

In use, the fairing shell 30 may be positioned relative to the connection components 40 as described above so as to positionally align the head assembly 62b relative to the receiver 64b of the forward connection guide 60 as well as the head portion 74b of the guide bolt 74 relative to the receiver 78 of the aft connection guide 70. Thereafter, the manipulating the fairing shell 30 in forward and/or aft directions as may be needed causes the guide head assembly 62b to be received with in the channel defined by the receiver 64b and the head portion 74b of the guide bolt 74 to be received within the channel defined by the receiver 78. At this time, the quick-release fasteners 56 may be installed in the forward connection ribs 50 so as to secure the connection strips 54, and hence the forward part of the fairing shell 30, to the upper connection flanges 52a. The latches 90 may also be operated so as to latchably engage the latch pin 94b with the latch hook 96.

Prior to securing the fairing shell 30 to the connection components as described above, the intermediate supports 80 may be pre-adjusted so that the head portion 84b of the support bolt 84 is at the desired height to bear against the bearing plate 86a without exerting undue stress on the fairing shell 30. Should any height adjustment be required, then access can be gained to the intermediate supports 80 by opening the access door 32b to allow a technician to adjustably manipulate the support bolt 84 (e.g., by threadably turning the bolt in a desired direction until the proper position is achieved following which the adjustment nuts 86 can be secured to the upper leg 82b.

As should now be appreciated, the assembly described herein allows an antenna fairing to be quickly assembled and disassembled relative to an aircraft's airframe. However, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. An aircraft antenna fairing assembly comprising:
   a fairing shell; and
   connection components for positionally fixing the fairing shell to airframe structure of an aircraft, wherein the connection components comprise;
   (i) a guide assembly which includes a guide head and a receiver defining a generally C-shaped or U-shaped guide channel for receiving the guide head therewithin; and
   (ii) a latch assembly for latching the fairing shell to the airframe structure of the aircraft.

2. The aircraft antenna fairing assembly as in claim 1, wherein the guide assembly includes a guide arm having a proximal end connected to the fairing shell and an upright guide support having a base positionally fixed to the aircraft structure, wherein the guide head is provided at a distal end of the guide arm and the guide channel is provided at a distal end of the upright guide support.

3. The aircraft antenna fairing assembly as in claim 1, wherein the receiver is positionally fixed to the airframe structure and wherein the guide assembly includes a support bracket having a proximal end positionally fixed to the fairing shell, and a guide bolt having a shank portion threadably received at a distal end of the support bracket and a head portion aligned with the channel of the receiver.

4. The aircraft antenna fairing assembly as in claim 3, wherein the receiver of the guide assembly defines a generally U-shaped channel for receiving the head portion of the guide bolt therewithin.

5. The aircraft antenna fairing assembly as in claim 4, wherein the head portion of the guide bolt includes pad formed of a low friction material.

6. The aircraft antenna fairing assembly as in claim 1, wherein the connection components further comprise an intermediate support which includes a base support member, an upright support bolt having a head portion threadably connected to the base support, and a bearing frame which bears against the head portion of the upright support bolt.

7. The aircraft antenna fairing assembly as in claim 6, wherein the bearing frame is positionally fixed to the fairing shell and the support base is positionally fixed to the airframe structure of the aircraft.

8. The aircraft antenna fairing assembly as in claim 7, wherein the bearing frame includes a bearing flange which bears against the head portion of the upright support bolt.

9. The aircraft antenna fairing assembly as in claim 8, wherein the head portion of the upright support bolt includes a cushion pad formed of a low friction material.

10. The aircraft antenna fairing assembly as in claim 1, wherein the receiver defines a C-shaped channel which includes opposed chafing pads formed of a low friction material.

11. The aircraft antenna fairing assembly as in claim 1, wherein the latch assembly is operatively connected to the fairing shell and comprises an operation lever, a latch fork pivotally connected to the operation lever and a latch pin carried by the latch fork.

12. The aircraft antenna fairing assembly as in claim 11, wherein the latch assembly comprises a latch hook positionally fixed to the airframe structure, wherein the latch pin engages the latch hook to latch the fairing shell to the airframe structure.

13. The aircraft antenna fairing assembly as in claim 1, wherein the fairing shell comprises an access door.

14. The aircraft antenna fairing assembly as in claim 13, wherein the access door includes a door frame associated with the fairing shell, and a hinge assembly for hingedly connecting the access door to the door frame to allow hinged movements of the access door between open and closed conditions.

15. The aircraft antenna fairing assembly as in claim 14, wherein the access door includes a latch mechanism to maintain the access door in the closed condition thereof.

16. The aircraft antenna fairing assembly as in claim 1, wherein the connection components comprise a pair of connection ribs positionally fixed to the airframe structure and a plurality of fasteners received by the connection ribs to removably attach a portion of the fairing shell to the connection ribs.

17. The aircraft antenna fairing assembly as in claim 16, wherein the fairing shell comprises a pair of elongate connection strips attached to the fairing shell in alignment with the connection ribs, wherein the fasteners are received by the elongate strips and the connection ribs to removably attach the portion of the fairing shell to the connection ribs.

18. The aircraft antenna fairing assembly as in claim 16, wherein the connection ribs comprise an angled connection bracket having an upper forwardly sloped connection flange for receiving the fasteners therein, a lower substantially horizontally disposed flange for positional connection to the airframe structure, and an intermediate web joining the upper and lower flanges.

19. An aircraft which comprises the aircraft antenna fairing according to claim 1.

20. An aircraft antenna fairing assembly comprising:
    a fairing shell; and
    connection components for positionally fixing the fairing shell to airframe structure of an aircraft, wherein the connection components comprise;
    (i) a pair of forward connection ribs positionally fixed to the airframe structure and a plurality of fasteners received by the connection ribs to removably attach a front portion of the fairing shell to the connection ribs;
    (ii) a pair of forward guides comprising a guide arm having a proximal end connected to the fairing shell and an a guide support at a distal end, an upright guide support having a base positionally fixed to the aircraft structure and a C-shaped guide channel defined at a distal end of the upright guide support;
    (iii) a pair of rear guides comprising a support bracket having a proximal end positionally fixed to the fairing shell, a guide bolt having a shank portion threadably received at a distal end of the support bracket and a head portion, and a U-shaped channel positionally fixed to the airframe structure in this the head portion of the guide bolt is received; and
    (iv) a latch assembly for latching the fairing shell to the airframe structure of the aircraft.

21. The aircraft antenna fairing assembly as in claim 20, wherein the latch assembly is operatively connected to the fairing shell and comprises an operation lever, a latch fork pivotally connected to the operation lever and a latch pin carried by the latch fork.

22. The aircraft antenna fairing assembly as in claim 21, wherein the latch assembly comprises a latch hook positionally fixed to the airframe structure, wherein the latch pin engages the latch hook to latch the fairing shell to the airframe structure.

23. The aircraft antenna fairing assembly as in claim 20, wherein the fairing shell comprises an access door.

24. An aircraft which comprises the aircraft antenna fairing according to claim 20.

* * * * *